(12) United States Patent
Nanbu

(10) Patent No.: US 6,572,141 B2
(45) Date of Patent: Jun. 3, 2003

(54) STORED GAS INFLATOR

(75) Inventor: Yuichi Nanbu, Tokyo (JP)

(73) Assignee: Takata Corporation, Tokyo (JP)

( * ) Notice: Subject to any disclaimer, the term of this patent is extended or adjusted under 35 U.S.C. 154(b) by 110 days.

(21) Appl. No.: 09/956,045

(22) Filed: Sep. 20, 2001

(65) Prior Publication Data
US 2002/0036399 A1 Mar. 28, 2002

(30) Foreign Application Priority Data

Sep. 28, 2000 (JP) .......................................... 2000-296661
Aug. 1, 2001 (JP) .......................................... 2001-233788

(51) Int. Cl.[7] ............................................. B60R 21/28
(52) U.S. Cl. ......................... 280/736; 280/737; 280/742
(58) Field of Search ................................. 280/736, 737, 280/741, 742

(56) References Cited

U.S. PATENT DOCUMENTS

| 5,470,104 | A | * | 11/1995 | Smith et al. ................. 280/737 |
| 5,494,312 | A | * | 2/1996 | Rink ........................... 280/737 |
| 5,634,661 | A | * | 6/1997 | Dahl et al. ................... 280/741 |
| 5,653,463 | A | * | 8/1997 | Jeong .......................... 280/737 |
| 5,711,547 | A | * | 1/1998 | Blumenthal et al. ......... 280/737 |
| 5,762,368 | A | * | 6/1998 | Faigle et al. ................. 280/737 |
| 5,820,162 | A | * | 10/1998 | Fink ........................... 280/742 |
| 5,992,881 | A | * | 11/1999 | Faigle ......................... 280/737 |
| 6,022,045 | A | * | 2/2000 | Faigle ......................... 280/736 |
| 6,247,725 | B1 | * | 6/2001 | Moller ........................ 280/737 |
| 6,328,336 | B1 | * | 12/2001 | Takahashi et al. ........... 280/737 |
| 6,447,007 | B1 | * | 9/2002 | DiGiacomo et al. ......... 280/741 |
| 6,516,726 | B2 | * | 2/2003 | Specht ........................ 102/530 |

* cited by examiner

Primary Examiner—Paul N. Dickson
Assistant Examiner—Toan C To
(74) Attorney, Agent, or Firm—Kanesaka & Takeuchi

(57) ABSTRACT

A stored gas inflator is formed by a pressure vessel including a gas port, a small chamber facing the gas port, and a main chamber situated adjacent to the small chamber and having a capacity larger than that of the small chamber. A high pressure gas is filled in the small chamber and the main chamber. A first partition closes the gas port, and a second partition separates the small chamber and the main chamber so that a burst pressure of the second partition is set to be lower than a stored gas pressure in the main chamber. A gas blasting initiator is mounted to the small chamber for applying burst pressure to at least one of the first and second partitions to allow the main chamber to eject the gas.

8 Claims, 3 Drawing Sheets

STORED GAS INFLATOR

BACKGROUND OF THE INVENTION AND RELATED ART STATEMENT

The present invention relates to a stored gas inflator which has a pressure vessel filled with high-pressure gas to eject the gas through a gas port, and more particularly, to a stored gas inflator comprising a burst shim for closing the gas port, and an initiator for applying burst pressure to the burst shim, wherein the burst shim is ruptured by the burst pressure from the initiator to open the gas port.

One known form of a gas supply unit for inflation of an airbag is a stored gas inflator which releases pressurized gas stored in a pressure vessel through a gas port. It should be noted that such an airbag is a safety device mounted in a vehicle such as an automobile and designed to be inflated to protect an occupant in the event of an emergency.

FIG. 4 is a sectional view showing a conventional example of such a stored gas inflator. The stored gas inflator 100 shown in FIG. 4 comprises a pressure vessel 102 which is filled with high-pressure gas. The pressure vessel 102 is provided with gas ports 104 for allowing the high-pressure gas filled therein to be released. Normally, the gas ports 104 are air-tightly closed by a thin-plate-like burst shim 106 which is disposed to overlay an inner surface of the pressure vessel 102. The burst shim 106 is ruptured to open the gas ports 104 when a predetermined pressure (burst pressure) is applied from the outside of the pressure vessel 102.

Near the gas ports 104 of the pressure vessel 102, an initiator (detonator) 108 for applying burst pressure to the burst shim 106 is disposed. The initiator 108 has a base portion 108a fixed to the outer surface of the pressure vessel 102, and a detonating portion 108b extending from the tip of the base portion 108a. The detonating portion 108b explodes in response to a detonation signal from a controller (not shown).

The pressure vessel 102 is provided, near the gas ports 104 thereof, with a burst pressure inlet 110 into which the detonating portion 108b is inserted. The aforementioned burst shim 106 also air-tightly closes the burst pressure inlet 110.

As the initiator 108 receives a detonation signal from the controller (not shown), the detonating portion 108b explodes in the burst pressure inlet 110 so as to apply burst pressure to the burst shim 106 facing the burst pressure inlet 110. As a result, the burst shim 106 is ruptured so as to open the gas ports 104, whereby the gas is released through the gas ports 104.

In the stored gas inflator 100 having the aforementioned structure, the burst shim 106 closing the gas ports 104 is always subjected to the stored gas pressure from the inside of the pressure vessel 102. On the other hand, the initiator 108 applies the burst pressure to the burst shim 106 from the outside of the pressure vessel 102 under a condition at a pressure (atmospheric pressure) significantly lower than the aforementioned stored gas pressure.

Therefore, to rupture the burst shim 106 against the stored gas pressure from the inside of the pressure vessel 102, the initiator 108 must apply burst pressure which is higher twice or more than the stored gas pressure of the pressure vessel 102, so that the required power (explosion power) of the initiator 108 should be extremely high.

It is an object of the present invention to provide a stored gas inflator which is triggered for gas releasing operation even with a relatively low power initiator.

Further objects and advantages of the invention will be apparent from the following description of the invention.

SUMMARY OF THE INVENTION

A stored gas inflator of the present invention comprises: a pressure vessel filled with high-pressure gas and having a gas port, a burst shim for closing the gas port; and a gas blasting initiator for applying burst pressure to the burst shim. The pressure vessel is divided into a small chamber facing the gas port and a main chamber having a capacity larger than that of the small chamber. The burst shim is composed of a first burst shim, and a second burst shim, wherein the small chamber and the gas port are partitioned from each other by the first burst shim, and the small chamber and the main chamber are partitioned from each other by the second burst shim. The small chamber and the main chamber are filled with high pressure gas, respectively, and the initiator is mounted to the small chamber. The burst pressure of the second burst shim is set to be lower than the stored gas pressure of the main chamber.

According to the stored gas inflator as mentioned above, the initiator explodes inside the small chamber filled with the high-pressure gas. The first burst shim closing the gas port is always subjected to the stored gas pressure from the inside of the small chamber. As the initiator explodes inside the small chamber, gas blasted by the initiator rapidly increases the inner pressure of the small chamber. When the inner pressure of the small chamber reaches the burst pressure of the first burst shim, the first burst shim is ruptured.

In the stored gas inflator of the present invention, the initiator increases the stored gas pressure in the small chamber, and the increased pressure ruptures the first burst shim. Therefore, the initiator may have such power capable of increasing the stored gas pressure in the small chamber to the burst pressure of the first burst shim. That is, even a relatively low power initiator can easily rupture the first burst shim.

In the stored gas inflator of the present invention, it is preferable that, in the pressure vessel, the small chamber and the main chamber communicate with each other through a small hole.

According to this structure as mentioned above, the small chamber and the main chamber are always at the same pressure in the normal state before the actuation of the initiator. The second burst shim is subjected to the same pressure from the both sides. Therefore, a member which can be ruptured when subjected to a relatively low gas pressure can be employed as the second burst shim. This can eliminate the need of another process of filling gas into the small chamber besides the process for the main chamber. Filling of gas into both of the small chamber and the main chamber can be achieved by only one filling process, thereby facilitating the assembly of the stored gas inflator.

In one embodiment of the present invention, the gas pressure in the small chamber is increased according to the detonation of the initiator, thereby rupturing both the first burst shim and the second burst shim and thus releasing the gas.

In another embodiment of the present invention, the gas pressure in the small chamber is increased according to the detonation of the initiator, thereby first rupturing the first burst shim and thus releasing gas from the small chamber. Then, the second burst shim is ruptured when the difference between the gas pressure in the small chamber and the gas pressure in the main chamber exceeds the burst pressure of the second burst shim, thereby releasing the gas filled in the main chamber.

DETAILED DESCRIPTION OF PREFERRED EMBODIMENTS

Figure 1A:
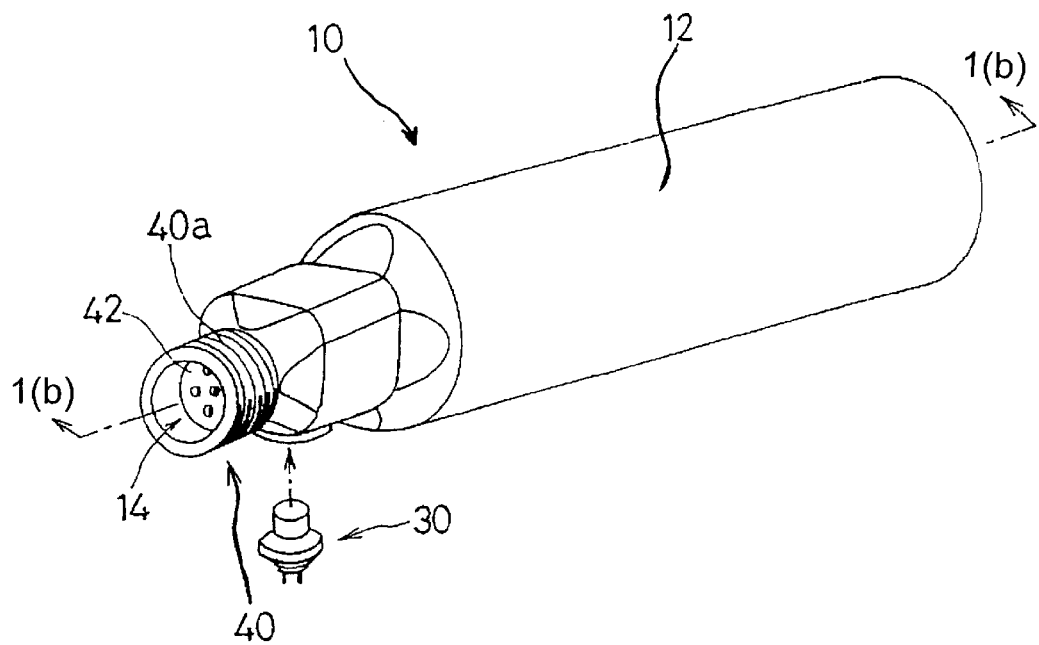
FIGS. 1(a) and 1(b) are explanatory views showing the structure of a stored gas inflator according to an embodiment of the present invention.
Figure 1B:
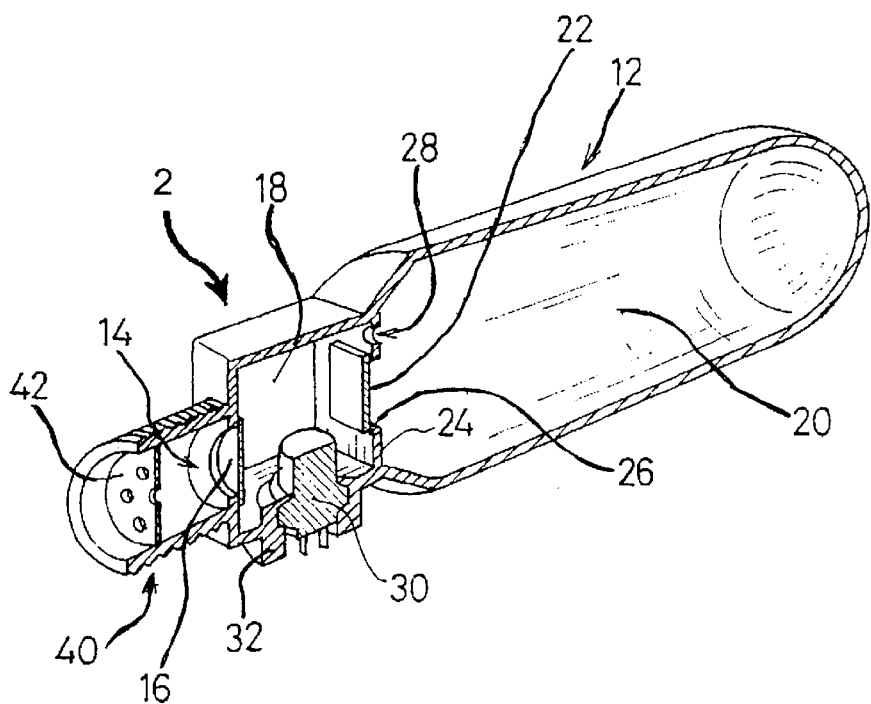
Figure 2:
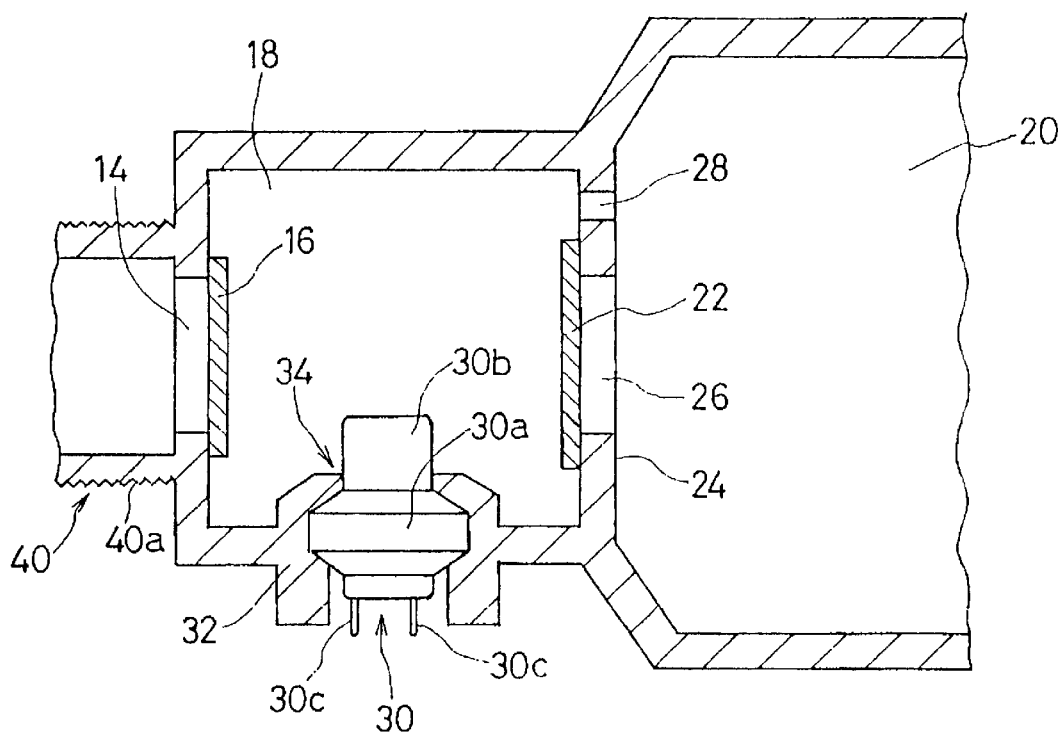
FIG. 2 is an enlarged sectional view of a portion 2 in FIG. 1(b)

Hereinafter, embodiments of the present invention will be described with reference to the attached drawings. FIGS. 1(a) and 1(b) show the structure of a stored gas inflator according to an embodiment of the present invention, wherein FIG. 1(a) is a perspective view of the stored gas inflator, and FIG. 1(b) is a perspective sectional view taken along line 1(b)—1(b) of FIG. 1(a). FIG. 2 is an enlarged sectional view of a portion 2 of FIG. 1(b).

The stored gas inflator 10 comprises a pressure vessel 12 which has an elongated cylindrical profile, and is filled with high-pressure gas. The gas in the stored gas inflator 10 is pressurized at a predetermined inner pressure Pm. The pressure vessel 12 is provided, at one end in the longitudinal direction, with a gas port 14.

The gas port 14 is closed by a first burst shim 16. The first burst shim 16 is designed to be ruptured to open the gas port 14 when subjected to a pressure equal to or higher than a predetermined pressure value P1 from the inside of the pressure vessel 12. The pressure value P1 is higher than the pressure Pm of the stored gas. Hereinafter, this pressure value P1 is called as "burst pressure P1" of the first burst shim 16.

The inside of the pressure vessel 12 filled with high-pressure gas is divided, by a second burst shim 22 and a partition 24, into a small chamber 18 facing the gas port 14 and a main chamber 20 having a capacity larger than that of the small chamber 18. At the boundary between the small chamber 18 and the main chamber 20 of the pressure vessel 12, the partition 24 is formed to stand in the centripetal direction from an inner surface of the pressure vessel 12. The partition 24 is provided at its center with a gas introduction opening 26. The second burst shim 22 is disposed to close the gas introduction opening 26 and to divide the small chamber 18 and the main chamber 20, and is connected to the partition 24 around the peripheral edge thereof.

The partition 24 is provided with a small hole 28 for allowing fluid communication between the small chamber 18 and the main chamber 20. The small hole 28 always allows the fluid communication between the small chamber 18 and the main chamber 20, whereby the gas stored in the small chamber 18 and the gas stored in the main chamber 20 are pressurized always at the same pressure (the aforementioned predetermined pressure Pm). In this state, the second burst shim 22 is subjected to the same gas pressure Pm at the both sides, i.e. from the small chamber 18 and the main chamber 20.

The second burst shim 22 is designed to be ruptured to open the introduction opening 26 when subjected to a pressure equal to or higher than a predetermined pressure value P2. Hereinafter, this pressure value P2 is called as "burst pressure P2" of the second burst shim 22. The burst pressure P2 of the second burst shim 22 is lower than the pressure Pm of gas stored in the small chamber 18 and the main chamber 20.

As will be described later, in a first embodiment of the present invention, the burst pressure P2 is substantially equal to or slightly lower than (P1−Pm).

The small chamber 18 is provided with an initiator mounting portion 32. Mounted to the mounting portion 32 is an initiator 30 for applying burst pressure to the first and second burst shims 16 and 22.

The initiator 30 has a large-diameter base portion 30a and a detonating portion 30b extending from the tip of the base portion 30a. The initiator 30 has a connector 30c at the bottom of the base portion 30a, and is connected to an initiator controller (not shown) via the connector 30c. The detonating portion 30b explodes in response to a detonation signal from the initiator controller.

The initiator mounting portion 32 has a mounting hole 34 for the insertion of the detonating portion 30b into the small chamber 18. To mount the initiator 30 to the mounting portion 32, the detonating portion 30b is inserted into the small chamber 18 through the mounting hole 34 while the base portion 30a is air-tightly fitted in and strongly fixed to the mounting portion 32.

In this embodiment, the stored gas inflator 10 is provided with a tubular male threaded joint portion 40 continuously formed from the gas port 14. The male threaded joint portion 40 has external thread 40a formed on the outer surface thereof. Though there is no illustration, the male threaded joint portion 40 is screwed into a female threaded joint portion of a gas supply pipe for a passenger protection airbag mounted on a vehicle, such as an automobile, whereby the stored gas inflator 10 is air-tightly connected to the supply pipe for supplying gas to the airbag.

The small chamber 18 of the pressure vessel 12 is substantially rectangular in section taken along a direction perpendicular to the longitudinal direction. That is, in the small chamber 18, each pair of the opposite faces is flat and parallel to each other. By clamping such a pair of opposite faces with a tool, such as a wrench, the pressure vessel 12 can be rotated with a large torque, thereby securely screwing the male threaded joint portion 40 into the female threaded joint portion.

Inside the male threaded joint portion 40, a filter 42 is arranged for preventing fragments of the ruptured burst shims 16, 22 from entering together with gas stream into the aforementioned gas supply pipe during the gas releasing operation of the stored gas inflator 10.

Hereinafter, the operation of the stored gas inflator 10 having the aforementioned structure will be described.

The pressure vessel 12 which is divided into the small chamber 18 and the main chamber 20 is filled with high-pressure gas having inner pressure Pm. Because the small chamber 18 and the main chamber 20 communicate with each other through the small hole 28, the inside of the small chamber 18 and the inside of the main chamber 20 are both at the inner pressure Pm.

The first burst shim 16 closing the gas port 14 for providing communication between the small chamber 18 and the outside of the stored gas inflator is subjected to the stored gas pressure Pm from the inside of the small chamber 18. The second burst shim 22 dividing the vessel into the small chamber 18 and the main chamber 20 is subjected to the gas pressure Pm from the both sides, i.e. from the small chamber 18 and the main chamber 20.

In the event of an emergency, such as a vehicle collision, the initiator 30 receives a detonation signal from the initiator controller (not shown), whereby the detonating portion 30b exposed to the inside of the small chamber 18 explodes. This explosion rapidly increases the inner pressure of the small chamber 18.

In the first embodiment, by this rapid increase in the inner pressure of the small chamber 18, the first and second burst shims 16, 18 are ruptured substantially simultaneously or with some time difference so as to open the gas port 14 and the gas introduction opening 26. Therefore, the communication between the main chamber 20 and the gas port 14 is ensured, thereby releasing a large amount of gas from the gas port 14 into the airbag through the gas supply pipe.

In the stored gas inflator 10, the initiator 30 is mounted to the small chamber 18 which is filled with high-pressure gas, and is designed to increase the inner pressure of the small chamber 18 to the burst pressure of the first burst shim 16, thereby rupturing the first burst shim 16. Therefore, the initiator 30 is enough to have such power (explosion power) capable of increasing the stored gas pressure Pm in the small chamber 18 to the burst pressure P1 of the first burst shim 16. That is, a low power initiator may be employed as the initiator 30.

In this first embodiment, the first burst shim 16 is ruptured when the gas pressure in the small chamber 18 is increased from Pm by (P1−Pm). The second burst shim 22 is ruptured when the gas pressure in the small chamber 18 is increased from Pm by P2. P2 may be substantially equal to (P1−Pm) or slightly smaller than (P1−Pm). In either case, the gas pressure in the small chamber 18 is increased by (P1−Pm) and by P2 so as to rupture the burst shims 16, 22. In this first embodiment, it is preferable that the burst pressure P2 for the second burst shim 22 is set as lower as possible within a range where the first burst shim 16 can be ruptured.

In a second embodiment of the present invention, first, the first burst shim 16 is ruptured without rupturing the second burst shim 22 when the gas pressure in the small chamber 18 is increased by detonation of the initiator 30, whereby gas inside the small chamber 18 is released through the gas port 14. This gas release results in reduction in gas pressure in the small chamber 18. At a point when the gas is released from the small chamber 18 until the difference (Pm−P') between the gas pressure Pm exerted by the inner pressure of the main chamber 20 and the pressure P' exerted by the inner pressure of the small chamber 18 exceeds P2, the second burst shim 22 is ruptured, whereby the gas stored in the main chamber 20 is released through the gas port 14.

In this second embodiment, the burst timing of the second burst shim 22 can be adjusted by selecting the burst pressure P2 of the second burst shim 22 within a range lower than Pm. In this manner, the stored gas inflator 10 is operable as a dual stage stored gas inflator.

In the aforementioned embodiments, the stored gas inflator 10 has the pressure vessel 12 in which the small chamber 18 and the main chamber 20 communicate with each other through the small hole 28, whereby the high-pressure gas is filled in the small chamber 18 and the main chamber 20 simultaneously. In addition, the stored gas inflator 10 can be quite simply assembled. According to the design specification of the pressure vessel and/or the initiator, the small hole 26 may be eliminated and the small chamber 18 and the main chamber 20 may be air-tightly separated from each other. In this case, the small chamber 18 and the main chamber 20 are filled with high-pressure gas, respectively.

In the aforementioned embodiments, the burst shims 16, 22 may be separate thin disc members to close the gas port 14 and introduction opening 26, respectively. Alternatively, the burst shims 16, 22 may be fragile areas of extensions integrally formed with and extending from the peripheries of the gas port 14 and the introduction opening 26 to close the gas port 14 and introduction opening 26, respectively. The fragile areas are ruptured when subjected to the predetermined pressures.

Figure 3:
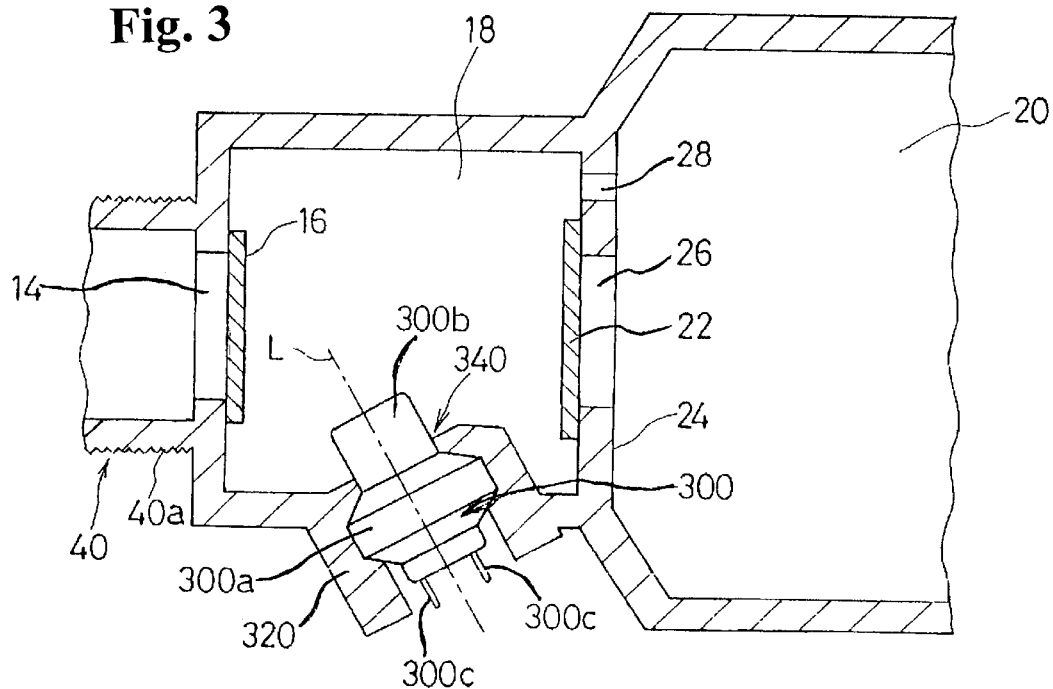
FIG. 3 is a sectional view of a main part of a stored gas inflator according to another embodiment of the present invention.
Figure 4:
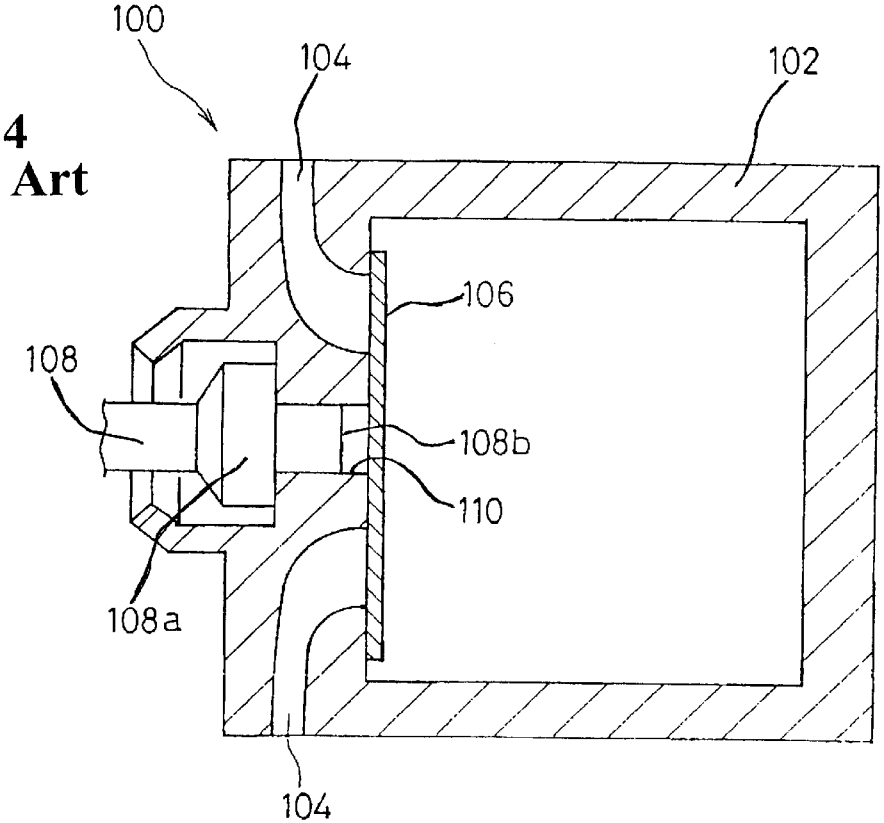
FIG. 4 is a sectional view of a stored gas inflator according to prior art.

The stored gas inflator of the present invention may have an initiator 300 which is mounted to the small chamber 18 in such a manner that the gas blasting direction of the initiator 300 is directed toward the first burst shim 16 as shown in FIG. 3. FIG. 3 is a sectional view similar to FIG. 2 but showing an example of the initiator according to another embodiment.

The initiator 300 has the same structure as in the initiator 30 mentioned above, that is, having a large-diameter base portion 300a and a detonating portion 300b extending from the tip of the base portion 300a. The initiator 300 has a connector 300c at the bottom of the base portion 300a, and is connected to an initiator controller (not shown) via the connector 300c. The detonating portion 300b explodes in response to a detonation signal from the initiator controller to blast high-pressure gas along the central axial line L of the initiator 300 extending through the base 300a and the detonating portion 300b.

An initiator mounting portion 320 to which the initiator 300 is mounted is formed in such a manner that the central axial line L of the initiator 300 is inclined toward the first burst shim 16, and, thereby, holds the base portion 300a such that the gas blasting direction of the detonating portion 300b which is exposed to the inside of the small chamber 18 through the mounting hole 340 is oriented toward the first burst shim 16.

According to this structure as mentioned above, as the detonating portion 300b of the initiator 300 explodes inside the small chamber 18, gas is blasted toward the first burst shim 16 so that the blast pressure directly acts as power for rupturing the burst shim 16, thus promoting the rupture of the burst shim 16. As a result, an initiator having further lower power can be employed as the initiator 300. Further, according to the second embodiment of the present invention, the initiator is arranged such that its axis is inclined toward the first burst shim as mentioned above, thereby ensuring the rupture of the first burst shim prior to the rupture of the second burst shim.

As described above in detail, a stored gas inflator of the present invention ensures its gas releasing operation even with a low power initiator.

While the invention has been explained with reference to the specific embodiments of the invention, the explanation is illustrative and the invention is limited only by the appended claims.

What is claimed is:

1. A stored gas inflator comprising:
  a pressure vessel including a gas port, a small chamber facing the gas port, and a main chamber situated adjacent to the small chamber and having a capacity larger than that of the small chamber,
  high pressure gas filled in the small chamber and the main chamber,
  a first partition attached to the pressure vessel for closing the gas port,
  a second partition situated inside the pressure vessel for separating the small chamber and the main chamber so that a burst pressure of the second partition is set to be lower than a stored gas pressure in the main chamber, and a gas blasting initiator mounted in the small chamber for applying burst pressure to at least one of the first and second partitions to allow the main chamber to eject the gas.

2. A stored gas inflator as claimed in claim 1, wherein said second partition includes a small hole for allowing communication between the small chamber and the main chamber.

3. A stored gas inflator as claimed in claim 2, wherein a burst pressure of the second partition is lower than an explosion pressure of the initiator when actuated.

4. A stored gas inflator as claimed in claim 1, wherein said first and second partitions are ruptured by an explosion pressure of the initiator.

5. A stored gas inflator as claimed in claim 1, wherein said first partition is first ruptured when the initiator is actuated so that the gas pressure in the small chamber is therefore reduced, and the second partition is ruptured when a difference between a stored gas pressure in the main chamber and a gas pressure in the small chamber exceeds a burst pressure of the second partition.

6. A stored gas inflator as claimed in claim 1, wherein said first partition is formed of a first partition wall fixed to the pressure vessel and having the gas port therein, and a first burst shim fixed to the first partition wall to close the gas port; and said second partition is formed of a second partition wall fixed to the pressure vessel and having a hole therein, and a second burst shim fixed to the second partition wall to close the hole, said first and second partition walls being ruptured when the initiator is actuated.

7. A stored gas inflator as claimed in claim 1, wherein said first and second partitions include fragile areas integrally formed therewith, respectively, said fragile areas being ruptured when the initiator is actuated.

8. A stored gas inflator as claimed in claim 1, wherein said initiator includes a detonating portion inside the small chamber directed to the first partition to initially rupture the first partition.

* * * * *